United States Patent [19]

Kinjo et al.

[11] 4,128,527

[45] Dec. 5, 1978

[54] DYNAMOELECTRIC MACHINE HAVING COIL WINDINGS AND CORE ENCAPSULATED WITH RESIN-FILLER COMPOSITION

[75] Inventors: Noriyuki Kinjo; Akio Nishikawa; Junichi Katagiri, all of Hitachi; Hitoshi Yokono, Katsuta; Tamotsu Ikeda, Hitachi; Tsuguo Kobayashi, Mito, all of Japan

[73] Assignee: Hitachi, Ltd., Japan

[21] Appl. No.: 787,098

[22] Filed: Apr. 13, 1977

[30] Foreign Application Priority Data

May 12, 1976 [JP] Japan .................................. 51-53194

[51] Int. Cl.$^2$ .............................................. C08K 7/14
[52] U.S. Cl. ............................... 260/42.18; 260/40 R; 260/23 EP; 260/23 AR; 260/42.28; 260/28.5 R; 310/43; 310/45
[58] Field of Search .................................. 310/43, 45; 260/42.28, 40 R

[56] References Cited

U.S. PATENT DOCUMENTS

| | | | |
|---|---|---|---|
| 3,562,201 | 2/1971 | Crowe et al. | 260/40 R |
| 3,658,750 | 4/1972 | Tsukui et al. | 260/38 |
| 3,758,799 | 9/1973 | Dorchterman et al. | 310/89 |
| 3,763,080 | 10/1973 | Deuyer | 260/38 |

*Primary Examiner*—Melvyn I. Marquis
*Attorney, Agent, or Firm*—Craig & Antonelli

[57] ABSTRACT

In a dynamoelectric machine having a stator assembly of coil windings and a core, a heat-dissipating, electro-insulative housing encapsulates the coil windings and the core. The housing is made of a cured molded article or material formed of a resin-filler composition which comprises a liquid unsaturated polyester resin, a finely divided calcium carbonate powder, an inorganic mineral particulate having a particle size larger than that of the calcium carbonate powder, and a chopped glass fiber, wherein the ratio by weight of the calcium carbonate to the mineral particulate is 0.3 to 4, the ratio of the weight of glass fiber to the total weight of the composition is 0.05 to 0.25, the ratio of the weight of the polyester resin to the total weight of the composition is 0.1 to 0.4 and the weight ratio of the calcium carbonate powder, the mineral particulate and the glass fiber to the total weight of the composition is 0.6 to 0.9.

The disclosure is also concerned with a dynamoelectric machine having a housing made of a cured article of a composition containing a certain amount of clay powder as a separation inhibitor.

17 Claims, 17 Drawing Figures

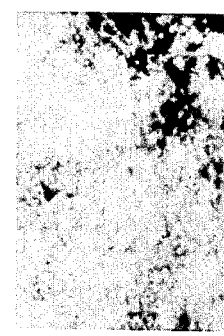
FIG. 3i
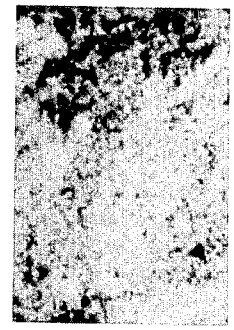
FIG. 3f
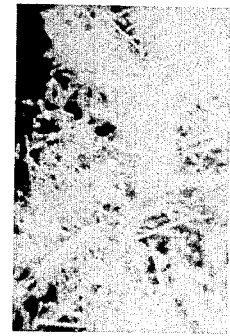
FIG. 3c
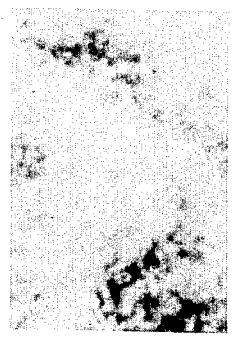
FIG. 3h
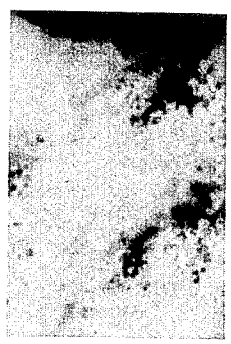
FIG. 3e
FIG. 3b
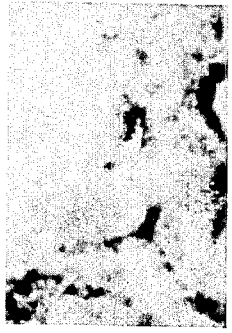
FIG. 3g
FIG. 3d
FIG. 3a

DYNAMOELECTRIC MACHINE HAVING COIL WINDINGS AND CORE ENCAPSULATED WITH RESIN-FILLER COMPOSITION

BACKGROUND OF THE INVENTION

1. Field of the Invention

The present invention relates to improvements in dynamoelectric machines having an electro-insulative, heatdissipating housing in which coil windings and a core of a stator are tightly and voidlessly molded, and more particularly, to dynamoelectric machines having improved electric and mechanical properties that are manufactured by the use of a resin-filler system with molding characteristics optimized for stators of dynamoelectric machines.

2. DESCRIPTION OF THE PRIOR ART

U.S. Pat. No. 3,758,799, titled "DYNAMOELECTRIC MACHINE", to Dochterman et al, discloses dynamoelectric machines having a housing which encapsulates stator coil windings and a core with a resin-filler composition system. The housing disclosed in the patent does not include a metal case or shell and does include a substantially rigid structure member of an interstitial mass of inert particulate material.

Adhesive material such as an unsaturated polyester resin occupies interstices of the mass and bonds inert particulates together and to remainder of the structure.

This patent discloses several kinds of resin-filler composition systems, which are most important for the dynamoelectric machines of this type. From the practical point of view, the dynamoelectric machines are manufactured by injection or transfer molding; therefore, characteristics of the resin-filler composition system must be fully investigated and optimized, otherwise the dynamoelectric machines of this type cannot be produced on an industrial basis. For example, in small sized motors or generators, coil windings made of fine wires are easily deformed during molding operation of the housing. Furthermore, in the motors or generators, slots formed in the inner periphery of a stator core are very narrow in width. If the resin-filler composition system has unsatisfactory flow properties, filling of the slots is insufficient. If the resin-filler composition system has a viscosity which is too small, resin separation will be large so that electrical properties of the stators of the dynamoelectric machines will be unsatisfactory.

There are still many other factors to be considered when stators of dynamoelectric machines disclosed in the U.S. Patent are manufactured by injection or transfer molding.

There have been proposed a variety of resin-filler composition systems such as disclosed in U.S. Pat. No. 3,658,750, titled "THERMOSETTING RESIN COMPOSITION AND ELECTRICAL APPLIANCES USING THE SAME" to Tsukui et al, and U.S. Pat. No. 3,763,080, titled "PRESSURE MOLDED ARTICLES AND MOLDABLE COMPOSITION", to Deuter. Tsukui et al disclose a resin-filler composition usable for transfer molding of rotor coils of motors, and of transformers, which comprises a thermosetting resin, a coarse powder filler having a particle size larger than 100 $\mu$m and a fine powder filler having a particle size smaller than 60 $\mu$m, an amount of the fillers being 40 to 80 percent by volume of the total volume. Tsukui et al also disclose addition of finely divided lead tetraoxide powder as a precipitation inhibitor. Investigations by the present inventors have shown that the resin-filler compositions disclosed in the Tsukui et al patent are not useful as a molding material for stators of small-sized dynamoelectric machines. The cured product of the compositions exhibited a small crack resistance and unsatisfactory flow properties when applied to stators of dynamoelectric machines.

Deuter discloses a moldable composition comprising a thermosetting resin, a particulate material having a particle size distribution such that about 95% to 100% passes a 30 mesh sieve, at least 50% passes a 40 mesh sieve and is retained on a 100 mesh sieve, and no more than a minor amount passes a 200 mesh sieve and a separation inhibitor. Deuter exemplifies as a separation inhibitor colloidal silica, aerosol Grade 200, powdered silica, powdered asbestos, extremely short glass fibers and powdered mineral wollastonite. Further, there are exemplified as a particulate material chromium ore, slate, chalk, zirconia, alumina calcium, carbonate, mica, beryllium oxide, magnesium oxide and sand. The particulate material should have a much larger particle size than the separation inhibitor. In other words, the particle size of the former is 40 to 100 mesh (more than 149 $\mu$m in diameter), while the particle size of the latter is about 0.012 $\mu$m in case of colloidal silica (Cab-O-Sil M-5).

According to the description of the Deuter patent, suitable separation inhibitors should have a particle size of 325 mesh or less (44 $\mu$m or less in terms of particle size). Investigations of the moldable composition disclosed in this patent showed that its molding characteristics were unsatisfactory and electric properties of the resulting housing of the stator were not good.

U.S. Pat. No. 3,562,201, titled "UNSATURATED POLYESTER RESIN/MONOMER MOULDING COMPOSITIONS", to Crowe et al., discloses a composition which comprises an unsaturated polyester resin, a primary absorbent filler and a secondary filler. The primary absorbent filler includes diatomite, bentonite, etc. and is able to absorb liquid from the polyester/monomer system to thereby improve flow properties of the composition. The secondary fillers, though not essential for the composition, include such as glass fiber, minerals, e.g. finely divided calcium carbonate, clay, alumina trihydrate, dolomite, asbestos, or synthetic fibers. Crowe et al. do not describe the particle size of the primary absorbent filler, but the present inventors believe the particle size thereof is very small because "Dicalite" used as the primary absorbent filler has an extremely small particle size. However, this composition has been found to be improper when applied to the injection or transfer molding of stators of dynamoelectric machines, especially for small sized dynamoelectric machines, because it showed unsatisfactory molding characteristics including flow properties.

SUMMARY OF THE INVENTION

Accordingly, it is an object of the present invention to provide an improved dynamoelectric machine having a heat-dissipating, electro-insulative housing in which stator coil windings and a core are rigidly and voidlessly molded within a new resin-filler composition system.

It is another object of the present invention to provide an improved dynamoelectric machine having a housing for encapsulating stator coil windings and a core, the housing being made of a cured article or material formed of a new resin-filler composition, molding characteristics of which are optimized for the housing of the stators.

It is still another object of the present invention to provide an improved dynamoelectric machine having an electro-insulative housing with improved electric properties.

According to the present invention there is provided a dynamoelectric machine having a new heat dissipating, electro-insulative housing made of a cured resin-filler composition comprising:

(I) a liquid unsaturated polyester resin containing an ethylenically unsaturated compound and a curing catalyst; and (II) an inorganic filler composition consisting essentially of,
 (a) a finely divided calcium carbonate powder, which passes a 325 mesh sieve,
 (b) an inorganic mineral particulate, at least 95% of which passes a 12 mesh sieve and is retained on a 200 mesh sieve, and
 (c) a glass fiber of a length larger than 200 $\mu$m and of a diameter less than 150 $\mu$m, wherein the ratios by weight of the respective components are as follows:

(a)/(b)=0.3 to 4, (c)/total weight of the composition=0.05 to 0.25, (I)/total weight of the composition=0.1 to 0.4, and (II)/total weight of the composition=0.6 to 0.9.

The present invention is also concerned with a filler-resin composition system in which clay powder having a particle size less than 44 $\mu$m is incorporated into the above-mentioned filler-resin composition system in a proportion of 0.05 to 0.15 per total weight of the composition.

Other objects and features and advantages of the present invention will be apparent from the following detailed description when read in conjunction with the accompanying drawings, in which:

BRIEF DESCRIPTION OF THE DRAWINGS

FIGS. 3a to 3i are photographs of resin-filler compositions showing the states of glass fibers after the compositions were subjected to kneading;

Figure 1:
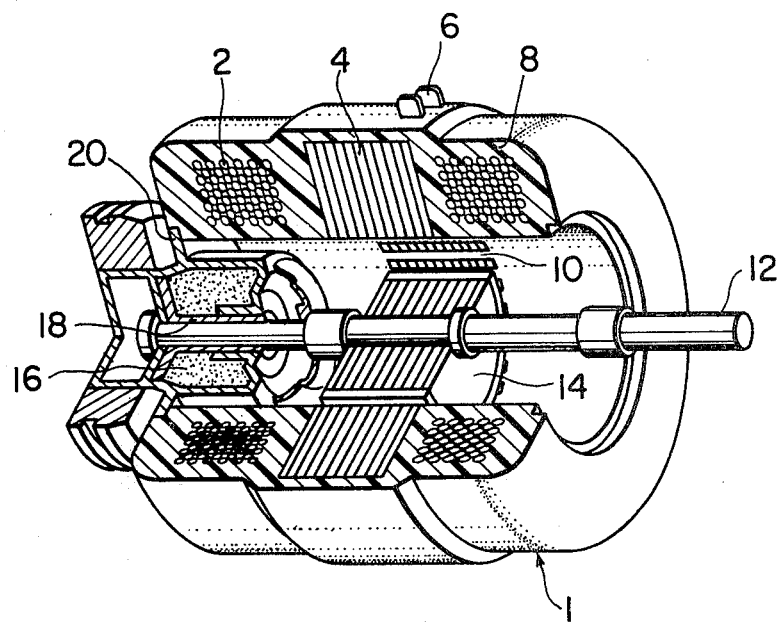
FIG. 1 is a perspective view, partially broken away, of a dynamoelectric machine according to the present invention.

DETAILED DESCRIPTION OF THE INVENTION (1) Unsaturated Polyester Resin

In the present invention only unsaturated polyester resins are useful from the viewpoints of economy, molding characteristics, etc. The unsaturated polyester resins should contain an ethylenically unsaturated compound monomer such as styrene and a curing catalyst such as dicumyl peroxide. Examples of suitable unsaturated polyester resins are such as disclosed in the U.S. Pat. No. 3,562,201.

Among the conventional unsaturated polyester resins most preferable are reaction products obtained by reacting an epoxy compound of bisphenol A type or novolac type with methacrylic acid, acrylic acid, or a methacrylate or an acrylate ester. An example of suitable base resins is "DERAKANE 411-45" marketed by Dow Chemical Co.

They have a suitable viscosity i.e. about 50 to 50,000 centipoises at room temperature (25° C.) when admixed with about 30%-45% by weight of an ethylenically unsaturated compound monomer such as styrene. The ethylenically unsaturated monomers may be called a cross-linking agent for the unsaturated polyester resin. The unsaturated polyester and ethylenically unsaturated monomers react with each other in the presence of a suitable curing catalyst when heated.

The unsaturated polyester resin employed in the present invention may include polycondensates or condensates synthesized from unsaturated or saturated polybasic acids and hydroxyl compounds in the presence or absence of a catalyst. When the term "unsaturated polyester resin" is used in the composition, it is used to mean a mixture comprising the condensates, an ethylenically unsaturated compound such as styrene and a curing catalyst such as benzoyl peroxide.

Typical unsaturated and saturated polybasic acids include maleic acid, maleic anhydride, fumaric acid, chloromaleic acid, dichloromaleic acid, methaconic acid, itaconic acid, adipic acid, sebacinic acid, phthalic acid, phthalic anhydride, isphthalic acid, pyrometritic acid, het acid, etc.

Hydroxyl compounds include diols such as ethylene glycol, diethylene glycol, triethylene glycol, polyethylene glycol, propylene glycol, dipropylene glycol, trimethylene glycol, tetramethylene glycol, hexamethylene glycol, 2.2-diethylpropane diol-1.3, neopentyl glycol, bromoneopentyl glycol, bisphenol dioxyethyl ether, hydrogenated bisphenol A, 2.2-di(4-hydroxy propoxy phenyl) propane, ethyleneoxide, propylene oxide, 3.3.3-trichloropropylene oxide, phenylglycidyl ether, arylglycidyl ether, etc. Such polybasic acids as having three or more carboxylic groups may be used in combination with the dibasic acids. Similarly, polyhydroxyl compounds having three or more hydroxyl groups may be used in combination with the glycols.

Various kinds of ethylenically unsaturated compound monomers are used to mix with the unsaturated polyester resins. For example, styrene, vinyl toluene, $\alpha$-methyl styrene, divinyl benzene, diallylphthalate, chlorostyrene, dichlorostyrene, bromostyrene, dibromostyrene, diallylbenzene phosphonate, diallyl-aryl phosphylate ester, triallylcyanurate, tribromophenol allylether, etc. Among the unsaturated compound monomers preferable are vinyl monomers such as styrene from the economical point of view. The unsaturated monomer is generally admixed with the unsaturated polyester resin in an amount of 20 to 50% by weight of the total weight of the resulting mixture.

The viscosity of the mixture of the unsaturated polyester and unsaturated monomer play a very important role. When the viscosity is too large, flow properties of the resin-filler composition system will not be suitable for the injection or transfer molding of stators of the dynamoelectric machines so that small cavities and interstices of coil windings will not be sufficiently filled with the composition system. On the other hand, when the viscosity is too low, separation between the mixture and fillers may occur so that designed electric and mechanical properties of the dynamoelectric machines will not be obtained. From the above and other points of view, the mixture consisting of the resin and unsaturated monomer should have a viscosity less than 50,000 centipoises but higher than 50 centipoises at room temperature.

When the mixture has a too small viscosity, addition of a suitable agent for increasing the viscosity may be useful. Such agent is, for example, diallylphthalate prepolymers. Preferably, the mixture should have a viscosity not smaller than 500 centipoises at room temperature.

According to the study of the composition it was found that a suitable amount of a diallylphthalate prepolymer was useful for adjusting a viscosity of the composition. When a viscosity of a unsaturated polyester resin used in a composition is too small, the separation between the resin and fillers is excessive, whereby mechanical and electrical properties of cured articles are not satisfactory. An additive amount of the diallylphthalate prepolymer is within a range of from 0.5 to 5% by weight based on the total weight of the composition. When the amount exceeds 5%, crack resistance of the cured articles is lowered. On the other hand, if the amount is less than 0.5%, an effect of the prepolymer is not expected. The prepolymer includes oligomers and prepolymers.

Curing catalysts for the mixture include, such as, benzoyl peroxide, parachloro benzylperoxide, 2.4-dichlorobenzoyl peroxide, caprylperoxide, lauroyl peroxide, acetylperoxide, methylethylketone peroxide, cyclohexanone peroxide, bis (1-hydroxy cyclohexyl) peroxide, hydroxyheptyl peroxide, t-butylhydroxy peroxide, p-menthanehydro peroxide, cumenhydro peroxide, 2.5-dimethylhexyl 1-2.5-dihydro peroxide, di-tert-butyl peroxide, dicumyl peroxide, 2.5-dimethyl-2.5-di(t-butyl peroxide) hexane, 2.5-dimethylhexyl-2.5-di(peroxybenzoate), t-butylperbenzoate, t-butylperacetate, t-butylperoctyloate, t-butylperoxyl butylate, di-t-butyl-di-perphthalate, 1.1-bis(t-butylperoxy) 3.3.5-trimethyl-cyclohexane, etc. The catalyst may preferably be added in an amount of 0.2 to 0.6% by weight per total weight of the composition.

In addition to the curing catalysts, conventional accelerators may be added to the mixture. There are various accelerators such as lauryl mercaptan, N-butyl sulfite, diphenyl sulfite, p-toluene sulfonate, quaternary ammonium salts, β-diketones, peracetate type epoxy compounds, sulfonium salts, sulfuric acid anhydride, hydrogen sulfide, manganese naphtholate, vanadyl octoate, copper naphtholate, calcium naphtholate, metal chelates, amine compound, and other phosphor-containing compounds, or sulfur-containing compounds.

Further, a suitable polymerization inhibitor may be added in order to prolong the pot life or shelf life of the resin-filler composition system. The polymerization inhibitors include p-benzophenone, naphthoquinone, phenanthraquinone, paraxyloquinone, 2.5-diphenyl-p-benzoquinone, 2.5-diacetoxy-p-benzoquinone, hydroquinone, p-t-butylcatecole, 2.5-di-t-butyl hydroquinone, mono-t-butylhydroquinone, di-t-butylparacresole, hydroquinone monomethylether, alphanaphthole, acetoamizine acetate, acetoamizine sulfate, hydrogen chloride salts of phenyl hydrazine, etc.

(II) Filler (a) Calcium carbonate powder

Calcium carbonate powder, which is chemically inert to the unsaturated polyester resins, includes pure calcium carbonate and other particulates whose main composition is calcium carbonate. The latter includes powders of calcium carbonate ores, i.e. limestone. The calcium carbonate powder should have a particle size not larger than 44 μm, preferably less than 20 μm. In other words 100% of calcium carbonate powder passes a 325 mesh sieve. In the specification, "Mesh" designates the U.S. mesh number. The calcium carbonate powder plays a very important role in the resin-composition system. According to investigations by the present inventors, it has been revealed that conventional typical fine fillers such as a finely divided quartz glass powder were not proper for the molding of stators of the dynamoelectric machines. When a quartz glass powder is used, it was found that glass fibers were finely ground and shortened during kneading the composition so that the function of the glass fibers for reinforcement of a cured article was substantially lost. On the contrary, when the calcium carbonate powder was used, the desired function of the glass fiber was maintained after kneading the composition.

The calcium carbonate powder is prepared by a known process which comprises selecting or dressing a limestone ore to remove other components than limestone, washing the dressed limestone with water, roughly grinding the limestone, grinding, sieving the resulting divided limestone to separate a fine limestone powder from a coarse limestone powder, finely grinding the fine limestone powder, and sieving the finely divided limestone powder to obtain a fine calcium carbonate powder, all of which passes a 325 mesh sieve.

Composition and properties of a typical calcium carbonate powder prepared by the above-mentioned process are as follows:

| | |
|---|---|
| $CaCO_3$ | 97.61(% by weight) |
| $SiO_2$ | 0.2 |
| $MgO$ | 0.26 |
| $R_2O_3$(R is a metal atom) | 0.11 |
| Water | 0.3 |
| Organic substances | 2.05 |
| pH | 9.4 |
| Mean particle size | 2.22μ |
| Surface area | 10 m$^2$/g |
| Bulkiness | 90–100 cc/100 g |

The above-mentioned calcium powder has a sufficient quality for the composition for the dynamoelectric machine; however, if desired, a refined calcium carbonate powder such as a precipitated calcium carbonate powder may be used. A process for preparing the precipitated calcium carbonate is well known in the art, which comprises the following steps:

(1) Calcining a limestone ore to convert $CaCO_3$ to $CaO$,
(2) Selecting $CaO$,
(3) Adding water to $CaO$ to form $Ca(OH)_2$, (4) Refining the crude $Ca(OH)_2$,
(5) Blowing $CO_2$ gas into $Ca(OH)_2$ to form $CaCO_3$,
(6) Dehydrating and drying $CaCO_3$, and
(7) Grinding the dried $CaCO_3$ to obtain a pure, fine $CaCO_3$ powder.

Since the precipitated calcium carbonate powder is rather expensive, as compared with the powdered limestone, the finely divided limestone powder is more proper for the composition system of the present invention from the economical point of view.

The relatively coarse limestone powder, which is obtained by separation from the fine limestone powder as mentioned hereinabove is one of the suitable particulates as the coarse filler. This coarse limestone powder has almost the same composition as that of the fine calcium carbonate powder.

(b) Mineral particulate

The inorganic mineral particulate used as a coarse filler includes various kinds of powders such as mica powder, alumina powder, slate powder, silica powder, sand, etc. This mineral particulate should also be chemically inert to the unsaturated polyester resin. From the economical and other points of view, river sand, mountain sand, beach sand and limestone powder are suitable materials.

At least 95% of the mineral particulate should pass a 12 mesh sieve and be retained on a 200 mesh sieve so that the particle size thereof ranges between 74 μm and 1,400 μm. Preferably, it should pass a 12 mesh sieve and be retained on a 150 mesh sieve. The sieve number used in the specification is designated by the U.S. mesh number. Relations between the mesh numbers and particle sizes are as follows:

12 mesh — 1,410 μm
32 mesh — 500 μm
60 mesh — 250 μm
100 mesh — 149 μm
150 mesh — 105 μm
200 mesh — 74 μm
250 mesh — 63 μm
325 mesh — 44 μm If the particle size of the mineral particulate exceeds 1,500 μm, the composition cannot flow into small cavities and interstices of the stators. On the other hand, if the particle size thereof is less than 70 μm, flow properties of the composition become poor due to an increase in viscosity of the composition. As a result, molding of the composition by means of an injection or transfer molding machine becomes difficult, and at the same time, mechanical properties, especially impact resistance of a cured article tends to be lowered.

River sand and mountain sand are commercially available in Japan as filler materials. River sand is classified into grades A-4, A-5, A-6 and A-7; mountain sand is classified into N-40, N-50, N-60 and N-80. It was found that the respective grades had the following particle size distributions.

The term such as "−12 mesh + 32 mesh" is meant that particles pass a 12 mesh sieve and are retained on a 32 mesh sieve.

The river sands of grades A-4, A-5, A-6 and A-7 are useful for the present invention because they have all a particle size of about 1500 μm to 70 μm. Among these grades preferable are grades A-4, A-5 and A-6. Since grade A-7 contains 2% of particles having a particle size less than about 100 μm, it has a larger tendency to increase a viscosity of the composition than do other grades.

The mountain sands of grades N-40, N-50 and N-60 are preferable for the present invention because at least 91% of them has a particle size larger than 105 μm. Since the grade N-80 contains a considerable amount of particles which pass a 200 mesh sieve and a mean particle size thereof is considerably smaller than those of other grades, the grade N-80 is not necessarily useful for the present invention.

(c) Glass fibers

There are several kinds of glass fibers which have been conventionally used as a reinforcing filler for resin-filler composition systems. In the present invention, any kind of conventional glass fibers are useful. The length and diameter of the glass fibers are important factors in the present invention. A number of experiments by the present inventors have revealed that the glass fibers should have a length of at least 200 μm in the resin-filler composition system. Though the glass fibers are ground and shortened during kneading the composition, such short glass fibers as having a length of 200 μm will not be excessively shortened, provided that a suitable amount of calcium carbonate powder is present in the resin-filler composition system. Preferably, the glass fibers should have a length of from 1,000 μm to 100,000 μm, while the upper limit of the length is not, in fact, critical.

In Japan, glass fibers for use in fillers, which have a length of from 25,000 μm to 65,000 μm are available. As mentioned above, glass fibers are shortened during kneading. When the inventors measured the length of glass fibers in the kneaded composition, they found that the glass fibers had a length of from 200 μm to 5,000 μm while some glass fibers having a length outside the above range were found in the kneaded composition.

By employing the calcium carbonate powder and the coarse filler having specific particle size as mentioned above, it was possible to avoid the excess shortening of the glass fibers during kneading.

The glass fibers should have a diameter less than 150 μm. If the diameter is too large, flexibility thereof is insufficient so that glass fibers will be excessively shortened during kneading. Preferably, the glass fiber should have a diameter of 50 to several microns, i.e. 5 to 20 μm. Glass fibers having a diameter of from 9 μm to 13 μm are on the market in Japan. Waste glass fibers obtained as a waste in the step of spinning of glass fibers are also Table 1

| Mesh | | River sand | | | | Mountain sand | | | |
|---|---|---|---|---|---|---|---|---|---|
| | | A-4 | A-5 | A-6 | A-7 | N-40 | N-50 | N-60 | N-80 |
| + 12 mesh | | — | — | — | — | 2% | — | — | — |
| − 12 mesh | + 32 mesh | 95% | 32% | 95% | 15% | 80 | 4% | — | 3% |
| − 32 mesh | + 60 mesh | 5 | 66 | 4.5 | 33 | 13 | 67 | 30% | 20% |
| − 60 mesh | + 100 mesh | — | 2 | 0.5 | 39 | 4 | 15 | 44 | 33 |
| − 100 mesh | + 150 mesh | — | — | — | 9 | 1 | 3 | 17 | 23 |
| − 150 mesh | + 200 mesh | — | — | — | 2 | — | 1 | 7 | 17 |
| − 200 mesh | + 325 mesh | — | — | — | — | — | — | 2 | 4 | useful because they are inexpensive. Also, unwoven glass cloth may be used in the chopped form.

As a summary, the glass fibers should preferably have a length of 1,000 to 100,000 μm before they are added to the resin composition and they should preferably have a length of from 200 to 5,000 μm after the composition system has been subjected to kneading.

(III) Clay Powder

In the present invention, clay powder is used as a separation inhibitor. Clay powder may be omitted when the filler-resin composition system has sufficient molding characteristics, or may be substituted with conventional separation inhibitors. Clay powder controls the separation between the unsaturated polyester resin and the filler. Although clay has conventionally been used as a filler, the present inventors have found that the function of clay powder as a separation inhibitor or a separation controlling agent is more important than as a filler. By changing the additive amount of clay powder to the composition, the degree of the resin separation or length of fins due to the resin separation could be properly adjusted.

Generally speaking, it may be desirable to totally prevent the resin separation. However, in the case of injection or transfer molding of stators, it was found by the inventors that a certain extent of the resin separation was necessary to produce dynamoelectric machines with good electric properties.

It was also found by the inventors that if there was no resin separation, very fine cavities and interstices, especially interstices between coil windings were not filled sufficiently with the resin-filler composition.

Clay powder should have a particle size less than about 40 μm. If the particle size is larger than 40 μm, its function as a separation inhibitor cannot be expected. Accordingly, all the clay powder should pass a 325 mesh.

According to experiments conducted by the present inventors it has been revealed that conventional separation inhibitors such as disclosed in the U.S. Pat. No. 3,763,080 were not necessarily useful for the resin-filler composition system for dynamoelectric machines. First, since colloidal silica (particle size 0.012 μm), amorphous silica (particle size 0.012 μm) and asbestos (particle size 0.00025 μm) have extremely small particle sizes, they have a tendency to scatter into the atmosphere. Fine powders floating in the atmosphere are bad for the health of the workers, although such conventional separation inhibitors as mentioned above are very effective as long as the prevention of resin separation is concerned. For example, only 0.5% of colloidal silica of the total weight of the composition system may be enough. Since this separation inhibitor is too effective, the degree of resin separation is so small that the filling of the small cavities and interstices with the resin-filler composition system will be insufficient. When the additive amount of colloidal silica or other conventional inhibitors is extremely decreased to adjust the degree of the resin separation, a uniform distribution of the inhibitor in the composition is not easy. From the above-mentioned reasons, only clay powder was chosen as a separation inhibitor in the present invention.

Ratios of the Components

Ratios by weight of the respective components are important for accomplishing the purposes of the present invention.

1. Ratio (a)/(b) of the calcium carbonate powder to the mineral particulate should be within a range of from 0.3 to 4 by weight. If the ratio is larger than 4, an impact value of a cured article of the resin-filler composition is low. Observations of the state of the kneaded composition through microscope has revealed that when the ratio of the calcium carbonate powder to the mineral particulate is less than 0.3, glass fibers were ground and shortened during kneading the composition to loose its reinforcing function. On the other hand, if the ratio is larger than 4, the flow properties of the composition system were not good, and small cavities and interstices in a stator were not sufficiently filled therewith.

2. Ratio ([II]/total weight of the composition) of the weight of fillers to that of the total weight of the composition should be within a range of from 0.6 to 0.9. If the ratio is less than 0.6, a mechanical strength and heat-dissipation property of a cured article or material formed from the composition system are not good. On the other hand, if the ratio exceeds 0.9, flow properties of the composition system will be poor. Therefore, such a composition is difficult for use in molding by a transfer or injection molding machine under low pressure (200 kg/cm$^2$ or less), because the composition system needs a high molding pressure so that the deformation of coil windings will occur. When clay powder is incorporated into the composition, the above-mentioned ratio ([II]/total weight of the composition) is shifted to a range of from 0.45 to 0.85.

3. Ratio ((c)/total weight of the composition system) of the glass fiber to the total weight of the resin-filler composition system should be within a range of from 0.05 to 0.25. If the ratio is less than 0.05 (i.e. 5%), a sufficient reinforcement by glass fibers is not expected. If the ratio exceeds 0.25 (i.e. 25%), flow properties of the composition system are not proper and the composition system becomes expensive. In order to obtain a cured article having an Izod impact value higher than about 2.5 kg cm/cm$^2$, which is considered the minimum value required for the stator housing, at least 5% of glass fibers is necessary.

4. ratio ([I]/total weight of the composition) of the polyester resin to the total weight of the resin-filler composition should be within a range of from 0.1 to 0.4 (i.e. 10 to 40%). When the ratio is smaller than 10%, adhesion of the particles of the fillers is not sufficient, and interstices between coil windings may remain unfilled with the composition. On the other hand, when the ratio is larger than 40%, the heat-dissipating characteristics of the housings made of a cured article are not good, and the coefficient of linear thermal expansion of the cured article is so large that cracks in the cured article occur and the separation between the cured article and metallic components of the stator may occur. Preferably, the ratio is within a range of from 0.15 to 0.3 so that the coefficient of linear thermal expansion of the cured article will be less than about $3 \times 10^{-5}$ cm/cm/° C., preferably $2 \times 10^{-5}$ cm/cm° C., and that the mechanical properties, especially impact resistance, of the cured article are good.

5. Ratio ([II]/total weight of the composition) of the clay powder to the total weight of the resin-filler compositions should be within a range of from 0.05 to 0.15. If the ratio is less than 0.05 (i.e. 5%), the resin separation during molding will become excessive. On the other hand, if the ratio is larger than 0.15 (i.e. 15%), the resin separation becomes too small; in other words, the function of the clay powder as a separation inhibitor becomes too strong. As a result, the filling of cavities and interstices in the stator with the composition is not sufficient, whereby electrical properties of a dynamoelectric machine will become unsatisfactory.

Other Additives

There are many kinds of additives, which have conventionally been used for molding compositions.

As is well known, short synthetic fibers such as acryl fibers, polyamide fibers, vinylon fibers may be incorporated into the resin-filler composition system.

Modifiers such as polybutadiene, polyethylene, polystyrene, phenol resin, epoxy resin, melamine resin, urea resins, etc. may be added to the composition system in an amount from 0.1 to 5% by weight per total weight of the composition. Further, a suitable separator such as calcium stearate, zinc stearate, stearic acid, polycrystalline wax, etc. is added to the composition system, preferably in an amount of 0.4 to 1.2% by weight per total weight of the composition. In order to improve wettability between the resin and filler, a suitable coupling agent such as vinylsilane, epoxysilane, aminosilane, etc. may be incorporated into the composition system, preferably in an amount of 0.2 to 1.0% by weight per total weight of the composition.

Various kinds of pigments such as titania, chromium oxide, carbon black, etc. may be added to the composition system, preferably in an amount of 0.2 to 2% by weight per total weight of the composition.

Molding Process

Injection molding machines and processes therefor are known in the art. In order to avoid the deformation of coil windings of stators, an inner liner type injection transfer molding machine is preferably used in the present invention. A molding pressure less than 200 kg/cm$^2$, preferably 75 to 20 kg/cm$^2$ is used in the present invention. A molding temperature is preferably within a range of 120° to 180° C. and molding time is preferably 1 to 10 minutes.

Detailed Description of the Drawings and Embodiments

FIG. 1 shows a perspective view, partially broken away, of a motor according to the present invention, in which coil windings 2 and core 4 are concentrically arranged around rotor 14. Coil windings 2 and core 4 are encapsulated with a cured article or material of a resin-filler composition system to form a heat-dissipating, electroinsulative housing 8. Slots 10 of the stator 1 each having a width of 5 mm are filled with the cured material. Accordingly, the stator components including coil windings are also filled with the cured material. To the housing is fixed an end bracket 20 in which a bearing assembly 18 is provided. Shaft 12 of the rotor 14 is supported on the bearing assembly 18.

EXAMPLE 1

In order to find the best combination of a fine filler with glass fibers, several experiments were carried out by the inventors.

Materials and compositions used in the experiments are as follows:

(1) Unsaturated polyester resin: A body of the unsaturated polyester resin is a mixture of 20% by weight of a reaction product obtained by reacting DER-331 with methacrylic acid and 80% by weight of a reaction product obtained by reacting DER-664 with methacrylic acid. (DER-331 and DER-664 are bisphenol A type epoxy resins.) The mixture contains 30% by weight of styrene monomer and 1% by weight of dicumyl peroxide, based on the total weight of the mixture.

(2) Mineral particulate: River sand: A-4, A-5, A-6 or A-7.

(3) Fine filler materials:
(i) Calcium carbonate powder: −325 mesh, a mean particle size is 2.22 μm.
(ii) Clay powder: 99.5% of the clay passes a 325 mesh sieve, a mean particle size is 3.2 μm.
(iii) Quartz glass powder: −325 mesh, a mean particle size is 1.9 μm.

(4) Glass fiber: 6,000 μm in length and 9 μm in diameter.

(5) Separator: Zinc stearate (Zn-St).
(6) Coupling agent: Methacryloxy silane

Compositions (parts by weight)
Unsaturated polyester resin: 100
(a mixture of the vinylesters)
Dicumyl peroxide: 1
Methacryloxy silane: 1
Zn-St: 1
Silica Sand/Fine Filler: 100/300, 200/200, 300/100 or
Glass Fibers: 27

Table 2

| Sand/Fine Filler (ratio) | | 0.3 | | 1.0 | | 3.0 |
|---|---|---|---|---|---|---|
| | | Initial | After heat-cycles | Initial | After heat-cycles | Initial | After heat-cycles |
| A$_4$ | | O O O | O O O | O O O | O X O | O O O | O X O |
| A$_5$ | CaCO$_3$ | O O O | O O O | O O O | O O O | O O O | O X X |
| A$_6$ | | O O O | O O O | O O O | O O O | O O O | O O O |
| A$_7$ | | O O O | O O O | O O O | O O O | O O O | O X O |
| A$_5$ | Clay | X X X | — | X X X | — | X X X | — |
| A$_5$ | Quartz glass | X X X | — | X X X | — | X X X | — |

Heat cycle: 130° C × 2h ⇄ −20° C × 2h Number of heat cycles: 50 cycles
O : No crack, X : crack, — : not tested

EXAMPLE 2

In order to find the best combination of a fine filler with glass fibers, other experiments were carried out in which only silica sand having a particle size of −32 mesh + 100 mesh was used in the instant experiments. For the purpose of comparison, Izod impact values of cured articles of resin-filler composition were measured.

Figure 2:
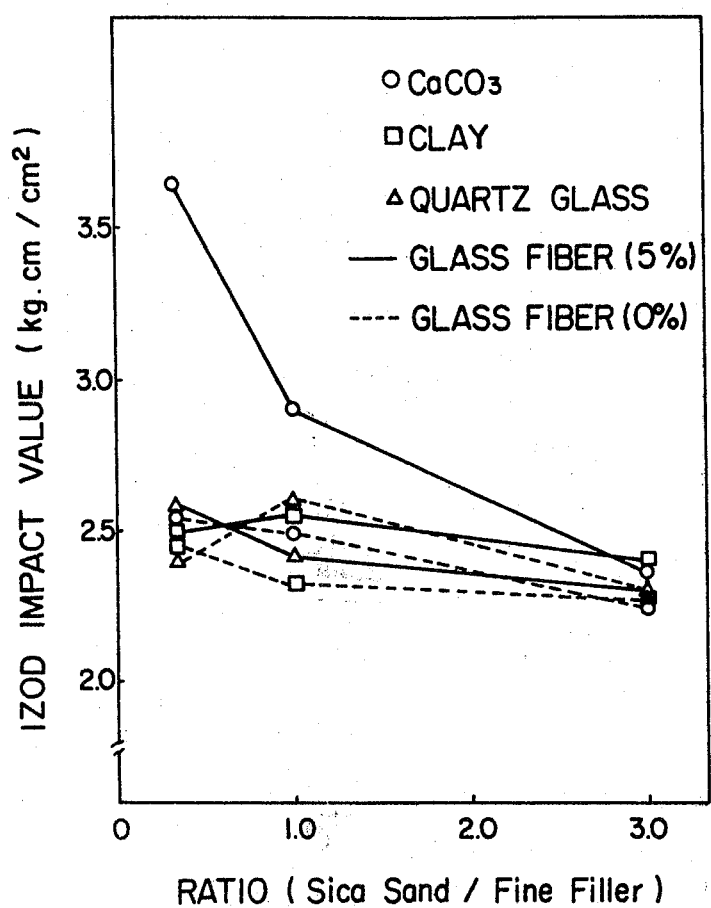
FIG. 2 is a graph showing relationship between length of resin separation and proportion of a coarse filler to fine fillers.

In FIG. 2 there is shown relationship between an Izod impact value (kg. cm/cm$^2$) plotted against filler compositions, which was obtained from the above-mentioned experiments. It is apparent from FIG. 2 that only the combination of calcium carbonate powder as a fine filler with glass fibers exhibits good impact resistance properties. Although the inventors have not determined fully the reason of this result, it is believed from the states shown in FIGS. 3a through 3i that calcium carbonate powder protects glass fibers during kneading the composition system so that the excessive grinding or shortening of the glass fibers is prevented. Photographs of FIGS. 3a–3i show the state of the composition systems after kneading. After each of the compositions was kneaded by means of a roll kneader, about 2 grams thereof was sampled. Then the sample was extracted with tetrahydrofurane to develop glass fibers. The state of the thus treated sample was observed through a microscope.

It will be apparent from FIGS. 3a-3c that the larger the amount of calcium carbonate powder relative to that of silica sand, the smaller the damage to glass fibers. In other words, a large amount of long glass fibers is observed in case where the ratio of silica sand to glass fiber is small. Further, it is apparent from FIGS. 3d-3i that substantially no long glass fiber is observed in the cases of the combinations of silica sand with quartz glass powder and with clay powder.

It will also be apparent from FIG. 2 and FIGS. 3a-3c that as the ratio of sand to calcium carbonate powder decreases, impact values increase. In other words, an amount of calcium carbonate powder should not be too small. Therefore, in the present invention, the ratio of (a) to (b) is set to 0.3 to 4.

Figure 4:
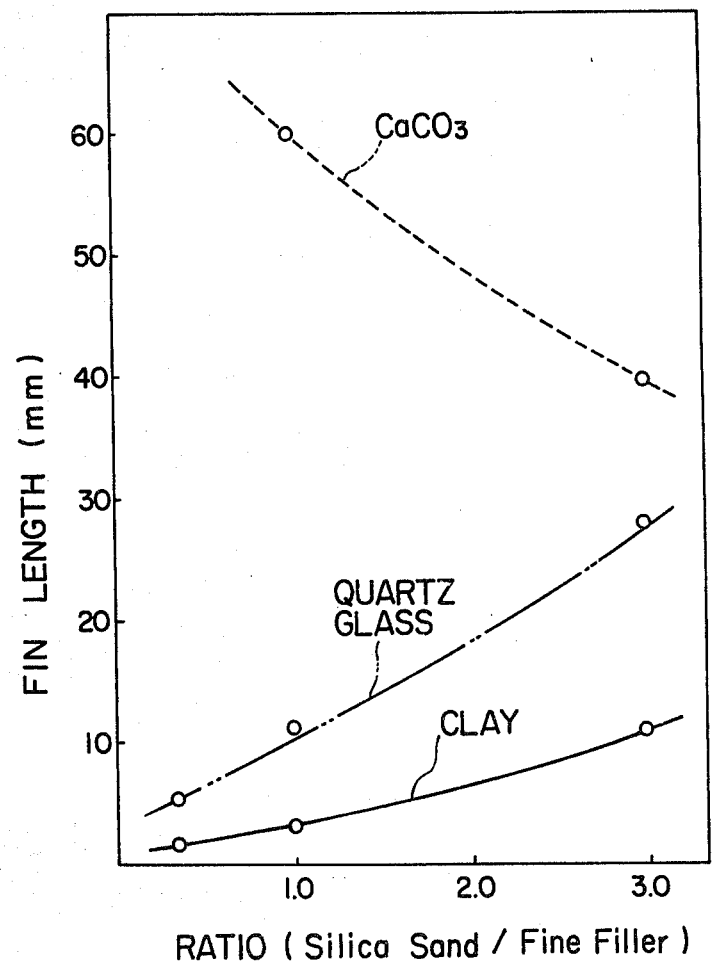
FIG. 4 is a graph showing relationship between length of fins due to resin separation and the amount of fine filler.

FIG. 4 shows the degree of the resin separation represented as length of fins formed by portions of resin squeezed from molds. Transfer molding temperature was 150° C., molding pressure 50 kg/cm$^2$ and molding time 4 minutes. According to FIG. 4, in the case of the calcium carbonate powder the fin length is largest in the three fine fillers.

Compositions used in these experiments are the same as those shown in FIGS. 2 and 3a-3i.

Figure 5:
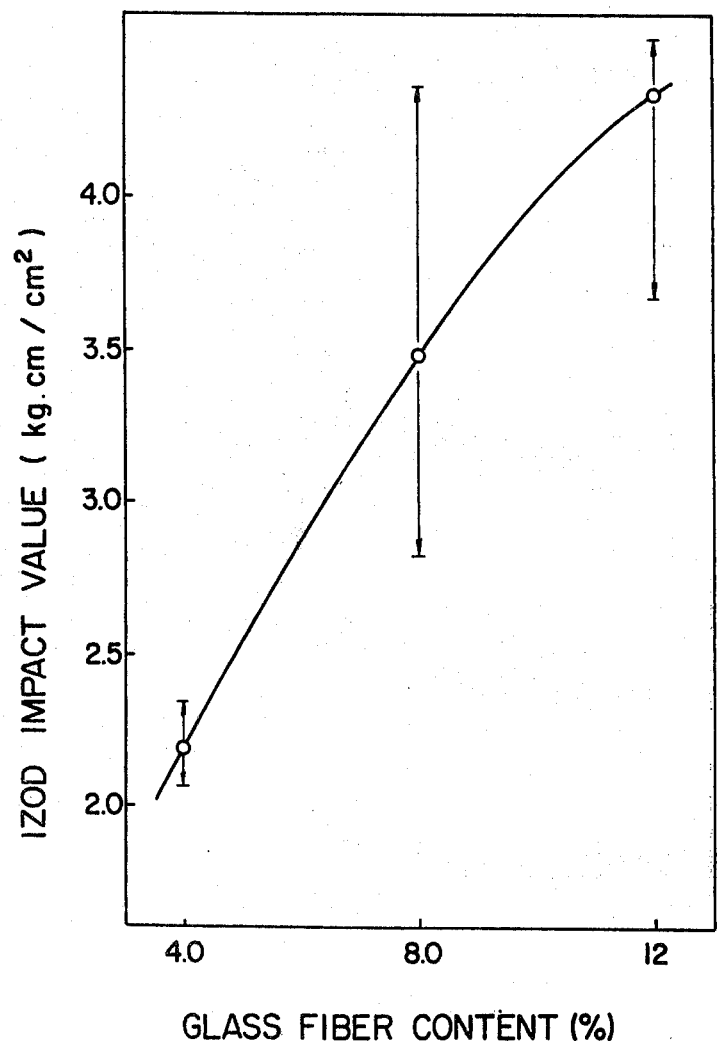
FIG. 5 is a graph showing relationship between Izod-impact value of a cured article and the content of glass fibers.

FIG. 5 shows relationship between an Izod impact value and an additive amount of glass fibers. Since at least 2 kg.cm/cm$^2$ of impact value is required for a stator housing of the small sized dynamoelectric machines, about 5% is the minimum additive amount of glass fibers. With an increase in the additive amount of glass fibers the impact value increases. However, the additive amount thereof should be lower than 25% by weight of the total weight of the composition system.

Figure 6:
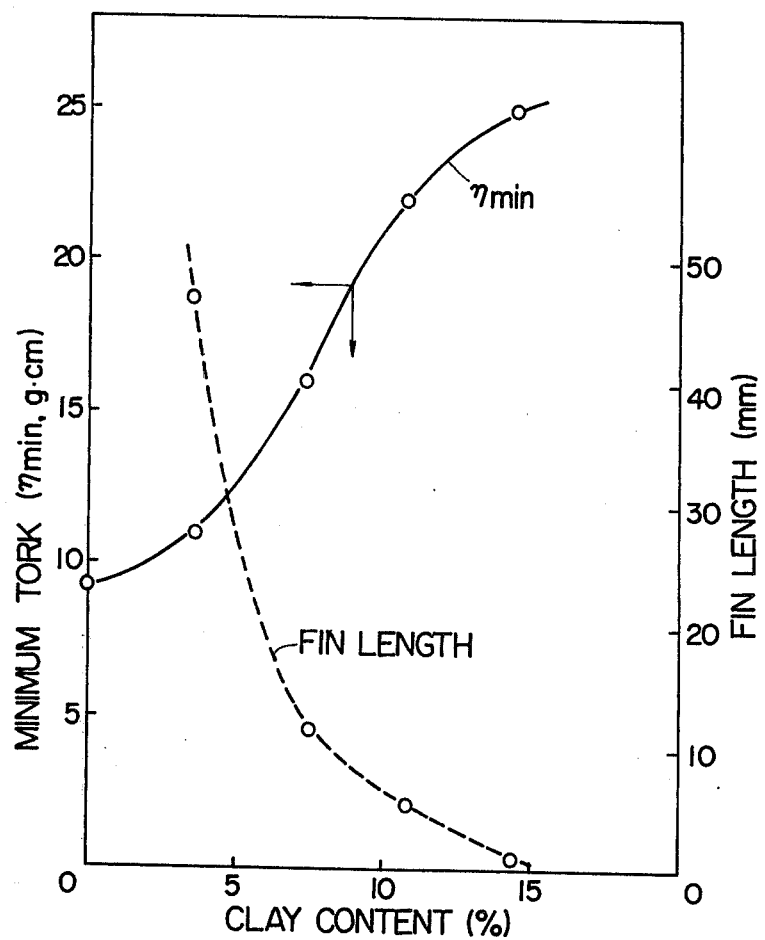
FIG. 6 is a graph showing relationship between the minimum torque plotted against the content of clay and length of fins due to resin separation.

FIG. 6 shows relationship between melt viscosity of the composition represented as minimum torque ($\eta$ min., g.m) plotted against an additive amount of the clay powder and the fin length. The minimum torque ($\eta$ min.) was measured by PLV 151 type Blakender Plasti-Corder Mixer Tg-30. The number of roller revolutions was 30 r.p.m., and 30 grams of a sample was cured under the heating condition of 7 min./50° C. → 130° C.

During the curing reaction the torque of Plasti-Corder was measured and plotted in FIG. 6. The change in torque may be regarded as a viscosity change of the composition. It is apparent from FIG. 6 that as the additive amount of clay powder increases, the viscosity (represented by the minimum torque $\eta$ min.) increases and fin length decreases. When the additive amount of clay powder is less than 5%, the viscosity ($\eta$ min.) is higher than about 13 (g.m) and the fin length is less than 25 mm.

Figure 7:
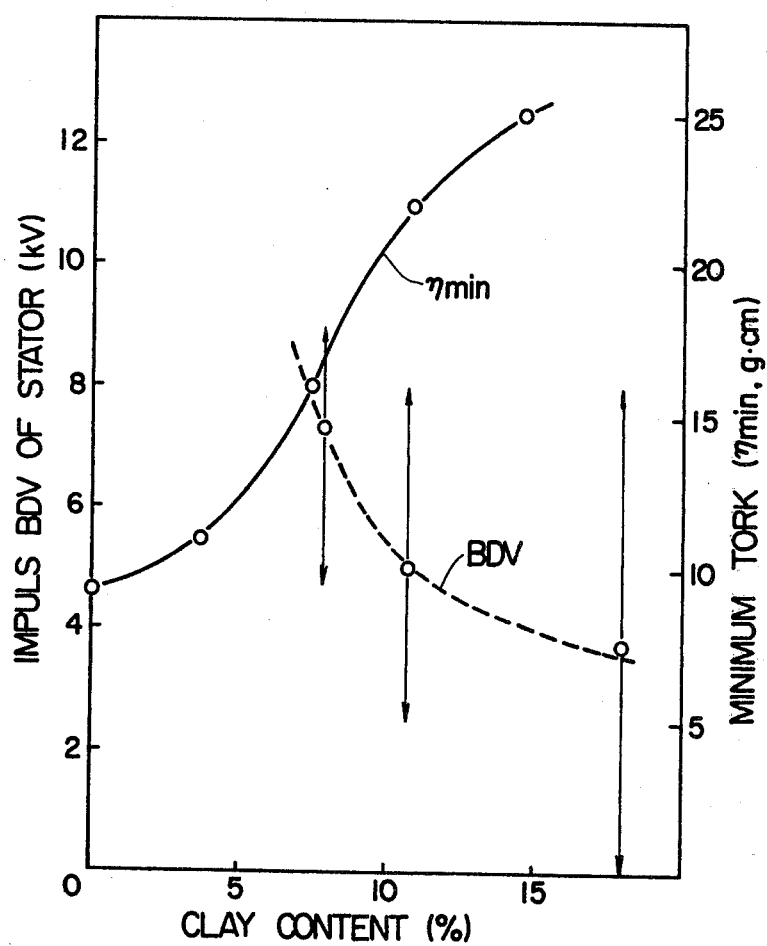
FIG. 7 is a graph showing relationship between impulse breakdown voltage plotted against the content of clay powder and the minimum length of fins due to resin separation.

FIG. 7 shows relationship between an impulse breakdown voltage of a molded stator and minimum torque ($\eta$ min.,g.m) plotted against clay content of the composition system.

Within the range of 5 to 15% of clay powder, the impulse breakdown voltage is above the lower limit of breakdown voltage, and the minimum torque is over 13 (g.m) within the range of 5 to 15% of the clay powder. Accordingly, the content of the clay powder should be 5 to 15% by weight so as to produce dynamoelectric machines with good electrical properties.

Figure 8B:
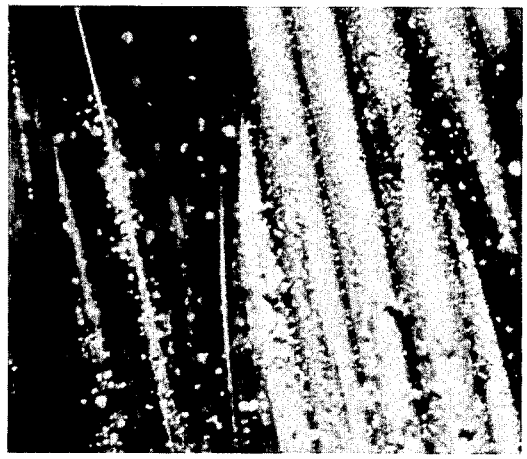
FIGS. 8a and 8b are photographs showing impregnation characteristics of resin-filler composition system into interstices of coil windings.
Figure 8A:

FIGS. 8a and 8b are photographs showing the state of interstices of coil windings impregnated with the resin-filler composition. FIG. 8a shows the impregnation with the composition system containing 18% of clay powder as a separation inhibitor and FIG. 8b shows the impregnation with the composition containing 7.6% of clay powder. Although the resin separation is prevented by increasing the content of clay powder, an excessive prevention of the resin separation brings about insufficient impregnation as is seen in FIG. 8a in which almost no impregnation of the interstices with the composition is observed. On the other hand, when the clay content is 7.6%, interstices between coil windings are sufficiently impregnated with the resin-filler composition as is seen in FIG. 8b.

EXAMPLE 3

Resin-filler compositions having the following compositions were prepared:

|  | parts by weight |
|---|---|
| Unsaturated polyester resin |  |
| Unsaturated polyester resin body used in Example 1 | 60 |
| Styrene monomer | 30 |
| Diallylphthalate prepolymer | 5 |
| Dicumylperoxide | 1 |
| Zn - St | 2 |
| Methacryloxy propyltrimethoxy silane | 1 |
| Filler |  |
| i) Silica sand |  |
| ii) Calcium carbonate (particle size less than $\mu$m) | shown in Table 3 |
| iii) Glass fibers (5,000 $\mu$ min. length, 6 $\mu$ m in diameter) | 60 |

5 test pieces of the respective compositions shown in Table 3 were molded by means of an inner linear type injection molding machine, and alternate current breakdown voltage (an incremental rate of voltage is 1 kv/sec.) of the test pieces were measured, and the results are shown in Table 3.

Table 3

| Silica sand ($\mu$m) | Impulse Breakdown Voltage (kV) Calcium carbonate / Silica sand (by weight) | | | | | |
|---|---|---|---|---|---|---|
|  | 0/100 | 25/75 | 50/50 | 75/25 | 90/10 | 100/0 |
| — 12mesh + 32mesh | molding impossible | 9 | 15 | 15 | 10 | <4 |
| — 32mesh + 60mesh | " | 10 | 14 | 13 | 11 | <4 |
| — 60mesh + 150mesh | <4 | 10 | 16 | 13 | 10 | <4 |
| — 100mesh + 250mesh | 7 | 9 | 13 | 10 | 7 | <4 |

From the results shown in Table 3, it may be said that when silica sand has a small particle size such as −100 mesh + 250 mesh and the ratio of calcium carbonate to the fine silica sand is outside of the range of 0.3 to 4, impulse breakdown voltages of the cured articles are not always good. It is also apparent that calcium carbonate and silica sand are essential for the composition to obtain a cured article with good electrical properties.

EXAMPLE 4

Composition systems having the following compositions were prepared:

Unsaturated polyester resin

Unsaturated Polyester resin body — 100 parts by weight (made from 23% maleic anhydride, 39% isophthalic acid and 38% propyleneglycol, 600 centipoises, containing 40% by a weight of styrene)
Dicumyl peroxide — 1
Zn - St — 2
Methacryloxy propyltrimethoxy silane — 1

Fillers (i) Silica sand (−32 mesh + 60 mesh)
(ii) Calcium carbonate (less than 10 μm)
(iii) Glass fibers (6,000 μm in length, 9 μm in diameter)

Wherein the ratio of the fillers was 45/45/10, and the total amount of fillers was changed as shown in Table 4.

Clay powder (particle size less than 44 μm, mean particle size 3.2 μm) — 40

Impulse breakdown voltages of test pieces were measured in the same manner as in Example 4.

Table 4

| Total amount of fillers (parts by weight) | 110 | 260 | 360 | 560 | 760 |
|---|---|---|---|---|---|
| Ratio of the resin to total weight of composition | 0.39 | 0.33 | 0.25 | 0.166 | 0.12 |
| Percentage of fillers by total weight of composition | 59 | 74 | 80 | 85 | 89 |
| Impulse breakdown voltage (kV) | 7 | 9 | 13 | 10 | 5 |

From the results shown in Table 3, it can be said that the ratio of the resin to the total weight of the composition shall be larger than 0.1.

EXAMPLE 5

A composition system having the following composition was prepared:

Unsaturated polyester resin

Unsaturated polyester resin body — 70 parts by weight (a reaction product obtained by reacting methacrylic acid and bisphenl A epoxy resin whose epoxy equivalent is 875–1025)
Styrene monomer — 30
Diallylphthalate prepolymer — 5
Dicumyl peroxide — 1
Zn - St — 2
Methacryloxy silane — 1

Fillers (i) Silica sand (−12 mesh + 60 mesh) — 202.5
(ii) Calcium carbonate (less than 10 μm) — 162.5
(iii) Glass fibers (6,000 μm in length, 9 μm in diameter) — 45

Clay powder used in Example 4 — 40

The composition was kneaded and 30 stators having a housing as shown in FIG. 1 were produced by injection molding using the above-mentioned composition. Impulse breakdown voltages between terminals 6 of coil windings were measured. A mean impulse breakdown voltage of the stators was about 7 kV.

EXAMPLE 6

The same experiments as in Example 4 were carried out except that the silica sand was substituted by a powder of limestone having a particle size of −60 mesh + 100 mesh. The results are shown in Table 5 below.

Table 5

| Total amount of fillers (a) + (b) + (c) (parts by weight) | 110 | 260 | 360 | 560 | 760 |
|---|---|---|---|---|---|
| Ratio of (I) to the total weight of composition | 0.41 | 0.26 | 0.2 | 0.15 | 0.11 |
| Impulse breakdown voltage (kV) | 7 | 10 | 13 | 12 | 8 |

EXAMPLE 7

The same experiment as in Example 5 was carried out in which fillers and clay powder had the following composition:

Limestone powder (−60 mesh + 100mesh): 202.5 parts
Calcium carbonate powder (less than 10 μm): 150
Glass fiber (6,000 μm in length, 9 μm in diameter): 45
Clay powder (−325 mesh): 52.5

A mean impulse breakdown voltage of 30 stators molded with the above-mentioned composition was 8.5 kV.

EXAMPLE 8

As an inorganic mineral particulate a limestone powder having a particle size of −60 mesh + 100 mesh was used. The same experiments as in Example 1 were carried out in which the composition had the following ingredients:

| (1) Unsaturated polyester resin used in Example 1 | 100 parts |
|---|---|
| (2) Dicumyl peroxide | |
| (3) Limestone powder (−12 mesh + 60 mesh) | |
| | 400 in total |
| (4) Calcium carbonate powder (−325 mesh) | |
| (5) Glass fiber (6,000 μm in length, 9 μm in diameter) | 27 |
| (6) Methacryloxy silane | 2 |

The ratios of calcium carbonate powder to the limestone powder are shown in Table 6 below.

Stators molded with the compositions were subjected to a heat cycle test, and the results thereof are shown in Table 6.

Table 6

| Ratio (CaCO$_3$/Limestone) | | | | | |
|---|---|---|---|---|---|
| 0.3 (25/75) | | 1.0 (50/50) | | 3 (75/25) | |
| Initial | After 50 heat cycles | Initial | After 50 heat cycles | Initial | After 50 heat cycles |
| ooo | ooo | ooo | ooo | ooo | ooo |

What we claim is:
1. A dynamoelectric machine comprising a stator assembly including coil windings and a core encapsulated with a heat-dissipating, electro-insulative housing, a rotor assembly including a shaft centrally disposed thereto, and a bearing assembly disposed to the stator assembly, for rotatably supporting the shaft, wherein the housing is made of a cured resin-filler composition comprising:
 (I) a liquid unsaturated polyester resin containing an ethylenically unsaturated compound monomer and a curing catalyst, which has a viscosity of from 50 to 50,000 centipoises at 25° C.; and
 (II) an inorganic, electro-insulative filler consisting essentially of
   (a) a calcium carbonate powder having a particle size corresponding to that of particles which can pass a 325 mesh sieve,
   (b) an inorganic mineral particulate having a particle size corresponding to that of particles which can pass a 12 mesh sieve and is retained on a 200 mesh sieve, and (c) a chopped glass fiber having a length larger than 200 μm and a diameter less than 150 μm after the composition has been kneaded, wherein the ratios by weight of the respective ingredients are as follows:

(a)/(b) = 0.3 to 4, (c)/total weight of the composition = 0.05 to 0.25, (I)/total weight of the composition = 0.1 to 0.4, and (II)/total weight of the composition = 0.6 to 0.9.

2. A dynamoelectric machine according to claim 1, wherein the mineral particulate is powder of limestone.

3. A dynamoelectric machine according to claim 1, wherein the mineral particulate is silica sand.

4. A dynamoelectric machine according to claim 1, wherein the length of the glass fibers is within a range of 200 to 5,000 μm after the resin filler composition system has thoroughly been kneaded.

5. A dynamoelectric machine according to claim 1, wherein the unsaturated polyester resin comprises a mixture of vinyl esters of a bisphenol A type epoxy compound or a novolac type epoxy compound with dimethacrylate or acrylate.

6. A dynamoelectric machine comprising a stator assembly including coil windings and a core encapsulated with a heat-dissipating, electro-insulative housing, a rotor assembly including a shaft centrally disposed thereto, and a bearing assembly, disposed to the stator assembly, for rotatably supporting the shaft, wherein the housing is made of a cured resin-filler composition comprising:

(I) a liquid unsaturated polyester resin containing a polymerizable vinyl monomer and a curing catalyst, which has a viscosity of from 50 to 50,000 centipoises at room temperature;

(II) an inorganic, electro-insulative filler consisting essentially of, (a) a calcium carbonate powder, which passes a 325 mesh sieve, (b) a mineral particulate which passes a 12 mesh sieve and is retained on a 150 mesh sieve, and (c) a chopped glass fiber having a length larger than 200 μm and a diameter less than 50 μm; and (III) a clay powder which passes a 325 mesh sieve, wherein the ratios by weight of the respective ingredients are as follows:

(a)/(b) = 0.3 to 4, (c)/total weight of the composition = 0.05 to 0.25, (I)/total weight of the composition = 0.1 to 0.4, (II)/total weight of the composition = 0.45 to 0.85, and (III)/total weight of the composition = 0.05 to 0.15.

7. A dynamoelectric machine according to claim 6, wherein the mineral particulate is a silica sand powder.

8. A dynamoelectric machine according to claim 6, wherein the mineral particulate is a powder of limestone.

9. A dynamoelectric machine according to claim 6, wherein the length of the glass fibers is within a range of from 200 to 5,000 μm after the resin filler composition system has thoroughly been kneaded.

10. A dynamoelectric machine according to claim 6, wherein the unsaturated polyester resin comprises a mixture of vinylesters of a bisphenol A type epoxy compound or a novolac type epoxy compound with dimethacrylate or acrylate.

11. A dynamoelectric machine comprising a stator assembly including coil windings and a core encapsulated with a heat-dissipating, electro-insulative housing, a rotor assembly including a shaft centrally disposed thereto, and a bearing assembly, disposed to the stator assembly, for rotatably supporting the shaft, in which interstices between the coil windings and cavities are rigidly and voidlessly filled with a cured article and the outer surface of the housing is exposed to the atmosphere so as to dissipate heat generated by operation of the dynamoelectric machine, wherein the cured article has a coefficient of linear thermal expansion less than $3 \times 10^{-5}$ cm/cm/° C. and is made of a resin-filler composition comprising:

(I) a liquid unsaturated polyester resin composition containing an ethylenically unsaturated compound monomer and a curing catalyst, which has a viscosity of from 50,000 to 50 centipoises at 25° C.;

(II) an inorganic, electro-insulative filler consisting essentially of, (a) a calcium carbonate powder which passes a 325 mesh sieve, (b) an inorganic mineral particulate, at least 95% of which passes a 12 mesh sieve and is retained on a 200 mesh sieve, and (c) a glass fiber having a length larger than 200 μm and a diameter less than 150 μm; and (III) a clay powder which passes a 325 mesh sieve, wherein the ratios by weight of the respective ingredients are as follows:

(a)/(b) = 0.3 to 4, (c)/total weight of the composition system = 0.05 to 0.25, (I)/total weight of the composition system = 0.1 to 0.4

(II)/total weight of the composition system = 0.45 to 0.85, and (III)/total weight of the composition system = 0.05 to 0.15

12. A dynamoelectric machine according to claim 11, wherein the calcium carbonate powder is a finely divided powder of limestone.

13. A dynamoelectric machine according to claim 11, wherein the mineral particulate is a silica sand powder which passes a 12 mesh sieve and is retained on a 150 mesh sieve.

14. A dynamoelectric machine according to claim 11, wherein the mineral particulate is a member selected from the group consisting of river sand, mountain sand, beach sand, limestone powder and combinations thereof.

15. A dynamoelectric machine according to claim 11, wherein the mineral particulate is a limestone powder.

16. A dynamoelectric machine according to claim 11, wherein the filler consists essentially of, (a) a calcium carbonate powder having a mean particle size less than 5 μm, (b) a mineral particulate, at least 95% of which passes a 12 mesh sieve and is retained on a 150 mesh sieve, the particulate being a member selected from the group consisting of river sand, mountain sand, beach sand, limestone powder and combinations thereof, and (c) a chopped glass fiber having a length of from 200 to 50,000 μm, and a diameter of 5 to 20 μm.

17. A dynamoelectric machine according to claim 16, wherein the length of the glass fiber is within a range of from 200 to 5,000 μm after the composition system has been kneaded.

* * * * *